US012160697B2

(12) United States Patent
LeBlanc et al.

(10) Patent No.: US 12,160,697 B2
(45) Date of Patent: *Dec. 3, 2024

(54) DEVICE IDENTIFICATION FOR A SYSTEM OF ELECTRONIC DEVICES

(71) Applicant: Apple Inc., Cupertino, CA (US)

(72) Inventors: Jason Joseph LeBlanc, Castro Valley, CA (US); Rohan Gupta, Union City, CA (US); Robert D. Zupke, San Jose, CA (US); Todd K. Moyer, Portland, OR (US); Cuneyt Bakan, Santa Clara, CA (US); Brooke L. Bunney, Mountain View, CA (US); Justin T. Ng, Temple City, CA (US); Jeff A. Kalt, San Francisco, CA (US); Tian Shi Li, Campbell, CA (US); Lionel B. Barrow, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,533

(22) Filed: Apr. 24, 2023

(65) Prior Publication Data

US 2023/0262375 A1 Aug. 17, 2023

Related U.S. Application Data

(63) Continuation of application No. 17/447,895, filed on Sep. 16, 2021, now Pat. No. 11,665,462.

(60) Provisional application No. 63/079,397, filed on Sep. 16, 2020.

(51) Int. Cl.
*H04R 1/10* (2006.01)
*H04R 5/033* (2006.01)

(52) U.S. Cl.
CPC ......... *H04R 1/1041* (2013.01); *H04R 1/1066* (2013.01); *H04R 1/1091* (2013.01)

(58) Field of Classification Search
None
See application file for complete search history.

(56) References Cited

U.S. PATENT DOCUMENTS

| | | | |
|---|---|---|---|
| 2017/0085988 A1 | 3/2017 | Hardi et al. | |
| 2021/0084402 A1 | 3/2021 | Terlizzi et al. | |
| 2021/0247950 A1* | 8/2021 | Ryu | H04R 1/1041 |

OTHER PUBLICATIONS

"Notice of Allowance," mailed Jan. 26, 2023 in U.S. Appl. No. 17/447,895. 8 pages (copy not provided).
"Notice of Allowance," mailed Apr. 12, 2023 in U.S. Appl. No. 18/080,613. 9 pages (copy not provided).

* cited by examiner

*Primary Examiner* — Qin Zhu
(74) *Attorney, Agent, or Firm* — Kilpatrick Townsend & Stockton LLP

(57) ABSTRACT

A detachable headband for a headphone system can incorporate a headband identification circuit that stores or encodes a headband identification parameter value. When the headband becomes attached to an ear cup, the headband can transmit the headband identification parameter value to the ear cup.

20 Claims, 12 Drawing Sheets

DEVICE IDENTIFICATION FOR A SYSTEM OF ELECTRONIC DEVICES

CROSS-REFERENCE TO RELATED APPLICATIONS

This application is a continuation of U.S. application Ser. No. 17/447,895, filed Sep. 16, 2021, which claims the benefit of U.S. Provisional Application No. 63/079,397, filed Sep. 16, 2020. The disclosures of both applications are incorporated by reference.

BACKGROUND

This disclosure relates generally to headphone systems and in particular to automatic identification of a headband in a headphone system.

A "personal audio device" refers to a device that produces sound to be heard by an individual user while limiting the audibility of that sound in an environment around the user. Headphones are one common type of personal audio device, which remain popular in part because they can provide superior acoustic performance as compared to more compact earbud systems. Headphones generally include one or two audio-producing earpieces (also referred to as "ear cups") that are designed to be worn over the ear or on the ear. The ear cups are connected to a headband, which can help to hold the ear cups in place and can also provide an electrical connection between the ear cups. The ear cups are designed to be worn such that an audio-generating speaker contained in each ear cup directs sound toward an ear of the wearer. A cushion made of compliant material is typically provided around a peripheral portion of the ear cup in order to provide spacing between the speaker and the user's ear and to provide user comfort while wearing the headphones. The cushion may also provide sound insulation, preventing sound generated by the ear cups from leaking into the environment and/or preventing external sound from reaching the user's ears.

Headphones are often used as accessories to a "host" device that can provide audio to the headphones. For example, headphones may be communicably coupled to a host device such as a mobile phone, tablet computer, laptop computer, gaming device, TV receiver, stereo system or any other device that can deliver an audio signal to the headphones via a wired or wireless communication channel.

SUMMARY

Certain embodiments of the present invention relate to headphone systems or other personal audio devices in which the earpieces (e.g., ear cups) are detachably connected to a headband that provides power and data connections between the ear cups. It is assumed that a user can detach one headband from the ear cups and replace it with a different type of headband. Different types of headbands can be distinguishable based on appearance (e.g., color, width, finish) and/or functionality (e.g., amount of cushioning, clamping force, size, etc.). In a headphone system with interchangeable headbands of different types, it may be desirable to identify the attached headband, e.g., to enable appropriate modifications to a user interface of a host device and/or to audio signals provided to or by the headphones.

Accordingly, some embodiments of the present invention relate to headbands for headphone systems. The headband can include a body, which can be elongate and arched to fit over a user's head. A connector can be disposed at each end of the body. For instance, each connector can be a plug (or insert) connector that is adapted to fit into a complementary receptacle connector of an ear cup. Within the body of the headband, power and data lines (e.g., wires) can be coupled between the connectors at either end to enable communication between the two ear cups. In addition, a headband identification circuit can be disposed within the body of the headband and coupled to at least one of the data lines. The headband identification circuit can be configured to generate a pulse sequence on the data line in response to ear cups becoming connected to both connectors. The particular pulse sequence can be associated with a specific type of headband, so that headband identification circuits in headbands of different types generate different pulse sequences. Receiver circuitry in one of the ear cups can detect the pulse sequence and determine a headband identifier based on the pulse sequence. In some embodiments, the ear cup that determines the headband identifier can communicate the headband identifier to a host device with which the headphone system is communicably coupled and/or to the other ear cup.

The following detailed description, together with the accompanying drawings, will provide a better understanding of the nature and advantages of the claimed invention.

DETAILED DESCRIPTION

Certain embodiments of the present invention relate to headphone systems or other personal audio devices in which the earpieces (e.g., ear cups) are detachably connected to a headband that provides power and data connections between the ear cups. It is assumed that a user can detach one headband from the ear cups and replace it with a different type of headband. Different types of headbands can be distinguishable based on appearance (e.g., color, width, finish) and/or functionality (e.g., amount of cushioning, clamping force, size, etc.). In a headphone system with interchangeable headbands of different types, it may be desirable to identify the attached headband, e.g., to enable appropriate modifications to a user interface of a host device and/or to audio signals provided to or by the headphones.

Figure 1:
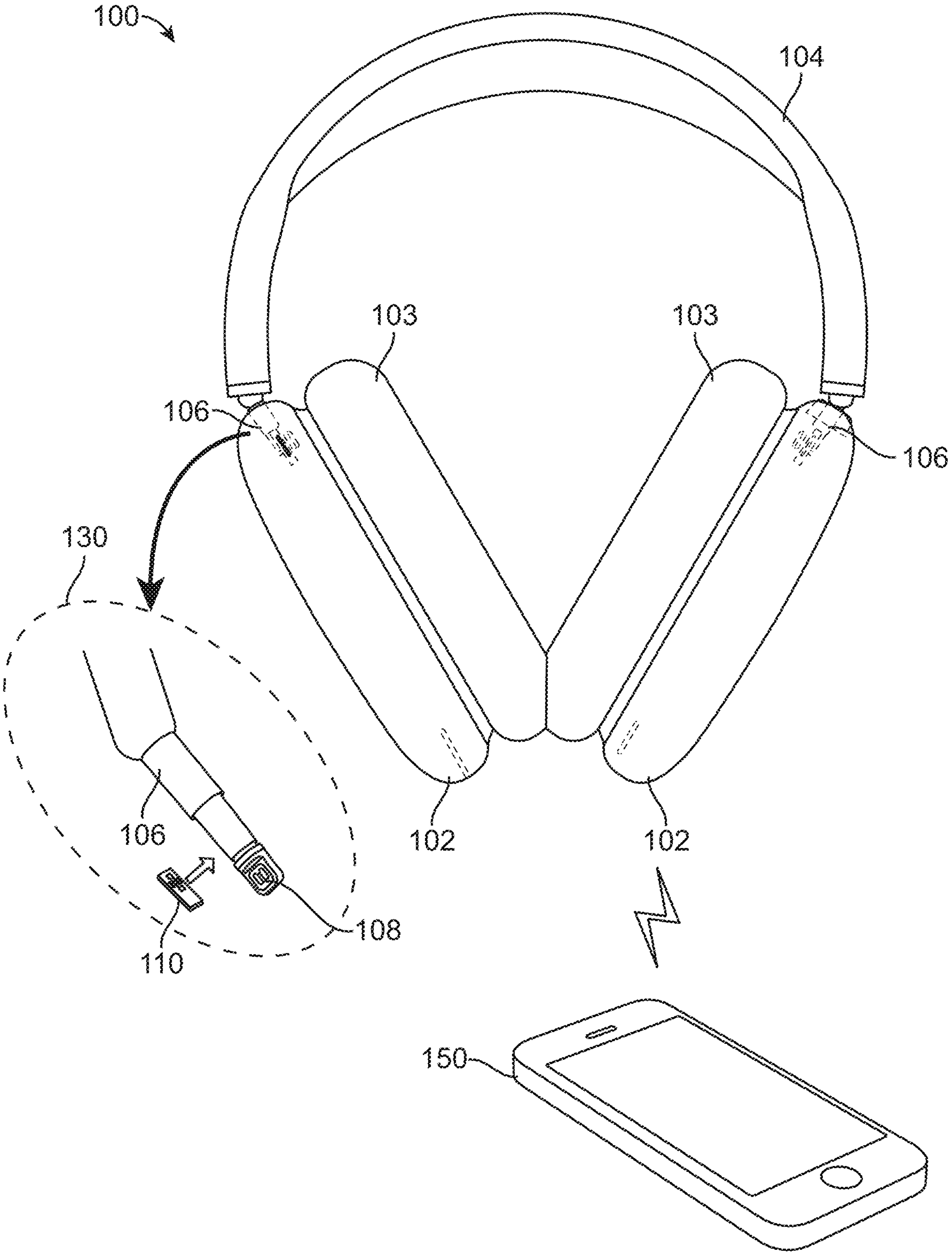
FIG. 1 shows an example of a headphone system according to some embodiments.

FIG. 1 shows an example of a headphone system 100 according to some embodiments. Headphone system 100 includes a pair of earpieces (also referred to as ear cups) 102 and a headband 104 that mechanically and electrically connects ear cups 102. Ear cups 102 can be made of rigid materials such as rigid plastic and/or metal. Ear cups 102 can be designed and shaped to fit on top of or around the pinnae of the user's ears, covering the concha cavum, and the portion of each ear cup 102 that rests against a user's head can be covered by a cushion 103 to provide increased comfort and/or improved acoustic performance. Ear cups 102 can incorporate one or more speakers to produce sound directed toward the user's ears, control electronics to operate the speakers, a signal interface to receive audio signals in digital or analog format, one or more user input controls (e.g., one or more touch sensitive areas on a surface of one or both of ear cups 102), and other components that can be of generally conventional design. Cushions 103 can be formed with a core of foam or other compressible material surrounded by a compliant structural layer that helps to define a shape of a periphery of cushions 103 without imparting rigidity. One or more additional textile layers can be applied if desired, e.g., for user comfort, durability, and/or esthetic appearance. In some embodiments, cushions 103 can be interchangeable by a user. Headband 104 can be connected between ear cups 102. Headband 104 can have an elongate, arch-shaped body designed to fit over the top of a user's head. The body of headband 104 can be made of a resilient material or otherwise designed to exert a compression force that pulls ear cups 102 toward each other, helping to hold ear cups 102 in position on a user's head. Portions of the body of headband 104 (e.g., a surface proximate to a user's head) can include padding as desired.

Headband 104 can be detachably attached to ear cups 102. For example, a connector assembly 106 can be disposed at each end of the body of headband 104. Each connector assembly 106 can include a plug (or insert) connector that fits into a corresponding receptacle connector on ear cup 102. Connector assemblies 106 can provide mechanical and electrical coupling between headband 104 and ear cups 102. For example, as shown in inset 130, each connector assembly 106 can include exposed electrical contacts 108 that can make contact with corresponding contacts (not shown) in the receptacle connector in ear cup 102. Electrical contacts 108 can be connected to data and/or power cables (or wires) that run the length of headband 104, thereby providing electrical connections between the two ear cups 102. In some embodiments, the two connector assemblies 106 of headband 104 can be identical, and either end of headband 104 can be connected to either of a pair of ear cups 102. Specific examples of connector insert assemblies 106 and complementary receptacle connector assemblies that can be used to connect headband 104 to ear cups 102 are described in U.S. patent application Ser. No. 17/023,013, filed Sep. 16, 2020, which is incorporated herein by reference. It will be appreciated that other connector assemblies can also be used.

For purposes of the present disclosure, it is assumed that multiple types of headbands 104 exist that are compatible with the same ear cups 102. In various embodiments, different types of headbands 104 may be distinct from each other in size, color, materials, and/or esthetic other attributes. In some embodiments, in addition to or instead of esthetic distinctions, different types of headbands 104 may have different effects on audio performance (e.g., the amount of clamping force exerted by a given headband 104 may affect the acoustic properties of ear cups 102), battery life (e.g., due to differences in the length of power and/or data cables within a given headband), and/or other functional characteristics of headphone system 100. In some embodiments, different types of headbands 104 can be user-interchangeable; that is, a user may attach different headbands 104 of different types to the same pair of ear cups 102 at different times, e.g., by connecting a desired headband 104 to ear cups 102. To facilitate identification of which headband 104 is currently attached to ear cups 102, each headband 104 can include a headband identification circuit 110 that encodes identification data indicating the type of headband. For instance, as shown in FIG. 1, headband identification circuit 110 can be disposed in connector assembly 106 at one end of headband 104. When headband 104 becomes connected to ear cups 102, headband identification circuit 110 can send identification data to one (or both) of ear cups 102, for example by generating pulses on a data line that runs between the connector assemblies 106 at either end of headband 104. The identification data can be read by circuitry within one (or both) of ear cups 102, allowing the behavior of headphone system 100 to automatically adapt based on the particular type of headband 104 that is attached at any given time. Specific examples are described below.

In some embodiments, headphone system 100 can operate as an accessory to a host device 150. Host device 150 can be, for example, a smart phone, a tablet computer, a laptop computer, a desktop computer, a wearable device (e.g., a smart watch), a game console or portable gaming device, or any other electronic device that provides audio output. Headphone system 100 can connect to host device 150 via a wired or wireless communication channel that supports transfer of audio data (in digital and/or analog formats) from the host device to headphone system 100. In some embodiments, the communication channel can be bidirectional, allowing headphone system 100 to communicate information to host device 150. For example, headphone system 100 can communicate headband identification data read from headband identification circuit 110 to host device 150, and host device 150 can modify its behavior based on the headband identification data received from headphone system 100. Specific examples are described below. It should be understood that information other than audio signals and headband identification data can also be communicated between headphone system 100 and host device 150. For example, headphone system 100 can provide a user input interface that includes, e.g., tactile controls (buttons, touch-sensitive surfaces, or the like) and/or a microphone for voice input, and headphone system 100 can communicate user input to host device 150. Host device 150 can be of conventional or other design, and presence of a host device is not required.

Examples of headband identification circuits will now be described. For purposes of description, it is assumed that headband identification data can be encoded as a numerical parameter value, with different parameter values corresponding to different headband types. For example, if headbands are distinguished by color, a parameter value of 1 can map to black, 2 to red, 3 to blue, 4 to white, and so on. If headbands are distinguished by color and width, a parameter value of 1 can map to a narrow black headband, 2 to a wide black headband, 3 to a narrow red headband, and so on. Any mapping of parameter values to headband types cam be defined. In various embodiments, any number of distinct parameter values can be supported, depending on the particular implementation of the headband identification circuit. During manufacture, a value of the identification parameter appropriate to a particular headband can be encoded or stored in the headband identification circuit for that headband. It is assumed that the parameter value does not change after initial encoding or storing; hence, the identification parameter value may be referred to as being "predetermined."

Figure 2:
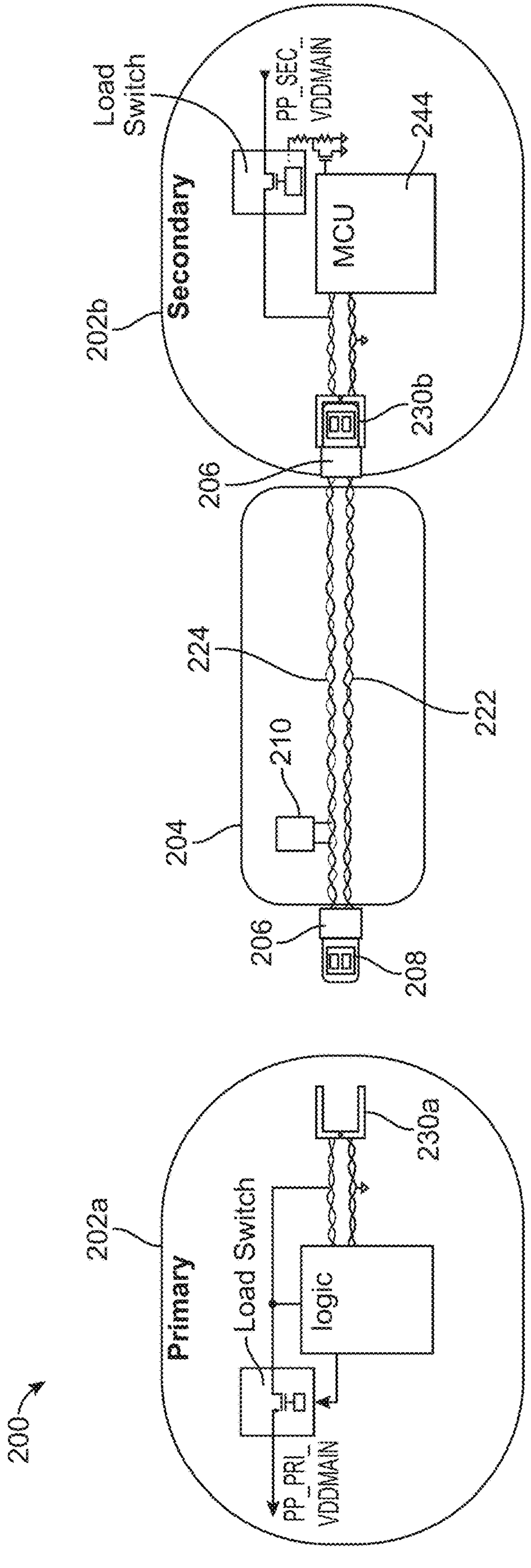
FIG. 2 is a simplified schematic diagram showing electrical connectivity of a headphone system according to some embodiments.

FIG. 2 is a simplified schematic diagram showing electrical connectivity of a headphone system 200 according to some embodiments. Headphone system 200 can be, e.g., an implementation of headphone system 100 of FIG. 1. Headphone system 200 includes a primary ear cup 202*a* and a secondary ear cup 202*b* (e.g., implementing ear cups 102 of FIG. 1). It is assumed that ear cups are made and distributed in pairs, each pair including a primary ear cup 202*a* and a secondary ear cup 202*b*. One or both of primary ear cup 202*a* and secondary ear cup 202*b* can include a battery (or other power source) and associated circuitry (e.g., for charging the battery), and one or both of primary ear cup 202*a* and secondary ear cup 202*b* can include a microcontroller unit (e.g., MCU 244) and communication interface circuitry to communicate with a host device such as host device 150 of FIG. 1. The components of primary and secondary ear cups 202*a*, 202*b* can be of conventional or other design, and a detailed description is omitted. Primary ear cup 202*a* and secondary ear cup 202*b* can each include a receptacle connector 230*a*, 230*b* that can be connected to headband 204, thereby attaching headband 204 to primary ear cup 202*a* and secondary ear cup 202*b*. In FIG. 2, primary ear cup 202*a* is shown as detached from headband 204 while secondary ear cup 202*b* is shown as attached to headband 204.

Headband 204 (e.g., implementing headband 104 of FIG. 1) can provide electrical connectivity between primary ear cup 202*a* and secondary ear cup 202*b*. For example, headband 204 can include power lines 222 and data lines 224. Power lines 222 and data lines 224 can include elongate electrically conductive structures that are insulated from other electrically conductive structures, having ends that can be electrically connected to other conductive structures. For example, each line can be a single-stranded or multi-stranded copper wire wrapped in a sleeve of insulating material. In some embodiments, power lines 222 and data lines 224 can support standard USB signaling protocols between primary ear cup 202*a* and secondary ear cup 202*b*. For instance, power lines 222 can provide DC power and can include a ground line and a positive (e.g., +5V DC) line, while data lines 224 can include a differential pair of data lines (D+/D−) supporting USB data communication. In some embodiments, two differential pairs of data lines 224 can be provided, with one pair of data lines providing a path for transmitting data from primary ear cup 202*a* to secondary ear cup 202*b* and the other pair of data lines providing a path for transmitting data from secondary ear cup 202*b* to primary ear cup 202*a*. Each end of power lines 222 and data lines 224 can be coupled into a connector 206 such that exposed contacts 208 include contacts that are electrically connected to each of power lines 222 and data lines 224. It should be understood that connectors 206 can be identical to each other, and accordingly receptacle connectors 230*a*, 230*b* can also be identical to each other. Thus, either instance of connector 206 can be interchangeably inserted into either of receptacle connectors 230*a*, 230*b*.

Headband 204 can include a headband identification (also referred to as "headband ID" or "HBID") circuit 210 that is connected to one or more of data lines 224. HBID circuit 210 can include, for example, an application-specific integrated circuit (ASIC) and supporting circuitry. In operation, the ASIC can generate a predefined series of pulses on one or more of data lines 224. The predefined series of pulses can represent a value of a headband identification parameter. Pulses on one or more of data lines 224 can be detected by receiver circuitry located in one or both of ear cups 202*a*, 202*b*, enabling one or both of ear cups 202*a*, 202*b* to read the value of the identification parameter. In some embodiments, HBID circuit 210 can be configured such that, in response to both of primary ear cup 202*a* and secondary ear cup 202*b* becoming attached to headband 204, HBID circuit 210 enters an active state in which the predefined series of pulses is generated, after which HBID circuit 210 transitions to a "dormant" (low-power) state, in which HBID circuit 210 consumes little or no power and does not affect data communication between primary ear cup 202*a* and secondary ear cup 202*b*. HBID circuit 210 can remain in the dormant state until a detachment followed by subsequent reattachment occurs. Examples of specific implementations of HBID circuit 210 are described below. In these and other embodiments, HBID circuit 210 can operate using the same electrical paths that are used for data communication between primary ear cup 202*a* and secondary ear cup 202*b*; no additional contacts or signal paths are required.

The pulse sequence generated by HBID circuit 210 can encode an identification parameter value using various techniques. In some embodiments, the parameter value can be encoded as a number of pulses, and headband identification can be based on pulse counting. For instance, HBID circuit 210 can be configured to generate a specific number of pulses associated with the headband type of headband 204, and secondary ear cup 202*b* (or primary ear cup 202*a*) can count the pulses to determine an identification parameter (e.g., a numerical value). In some embodiments, the mapping of pulse counts to an identification parameter can allow for error in counting (e.g., due to false negatives or false positives during pulse detection), providing more robust identification. For example, an identification parameter value of N (where N is a positive integer) can be indicated by a number 8N of pulses, and the parameter value N can be mapped to a detected count of 8N, 8N+1, or 8N−1 pulses. Thus, for example, if 7, 8, or 9 pulses are counted, then N=1; if 15, 16, or 17 pulses are counted, then N=2, and so on. Where pulse counting is used, the number of distinct identifiers may be limited by the maximum number of pulses that can be sent (which in turn can depend on design choices such as the available time to send pulses and the rate at which pulses can be generated) and the degree of robustness desired. Other schemes for encoding a parameter value, including encoding schemes based on pulse duration in addition to or instead of number of pulses, can also be employed depending on the particular implementation of HBID circuit 210.

Figure 3A:
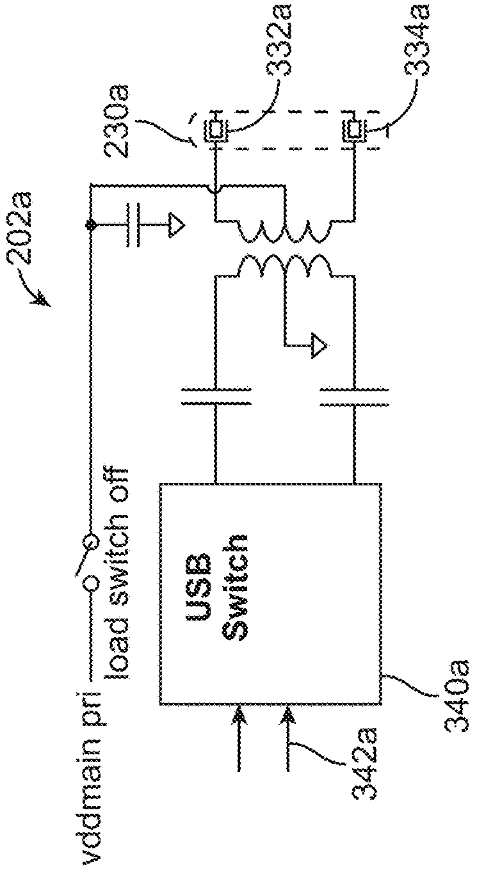
FIGS. 3A and 3B show additional details of a unidirectional data coupling for ear cups connected by a headband according to some embodiments.
Figure 3B:
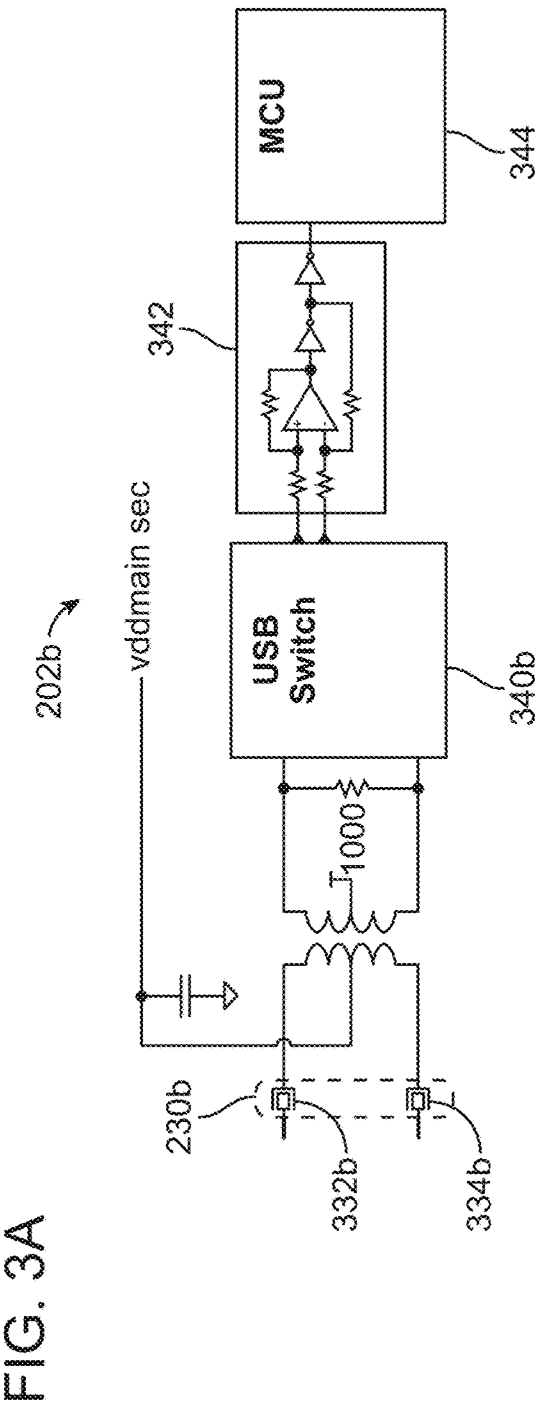

FIGS. 3A and 3B are schematic diagrams showing additional details of a unidirectional data coupling for ear cups connected by a headband according to some embodiments. FIG. 3A shows a transmitter data coupling for primary ear cup 202*a*, and FIG. 3B shows a receiver data coupling for secondary ear cup 202*b*. These couplings enable data to be transmitted from primary ear cup 202*a* to secondary ear cup 202*b*. As described below, headband identification pulses can be injected into this data path by HBID circuit 210. As shown in FIG. 3A, primary ear cup 202*a* includes a USB transmit switch 340*a* that can receive input signals on lines 342*a*. Such input signals can be generated, e.g., by a microcontroller or other component(s) of primary ear cup 202*a* and can represent any data or information that is to be transmitted to secondary ear cup 202*b*. USB transmit switch 340*a* is inductively coupled to differential data contacts 332*a*, 334*a*, which can be contacts in receptacle connector 230*a*. Similarly, as shown in FIG. 3B, secondary ear cup 202*b* includes a USB receive switch 340*b* that is inductively coupled to differential data contacts 332*b*, 334*b*, which can be contacts in receptacle connector 230*b*. As shown in FIG. 2, headband 204 can be connected between receptacle connector 230*a* and receptacle connector 230*b* and can include a pair of data lines 224 that couple data contact 332*a* to data contact 332*b* and data contact 334*a* to data contact 334*b*. USB receive switch 340*b* can be coupled to a UART circuit 342, which decodes the received signals and delivers them to a microcontroller unit (MCU) 334.

In operation, USB transmit switch 340*a* in primary ear cup 202*a* can receive input signals 342*a* and can generate a voltage differential between data contacts 332*a*, 334*a* responsive to input signals 342*a*. The voltage differential can propagate (via headband 204 connected between receptacle connectors 230*a* and 230*b* as shown in FIG. 2) to data contacts 332*b*, 334*b* of secondary ear cup 202*b*. USB receive switch 340*b* can sense the voltage differential and generate a digital data signal using circuit 342, which is delivered to MCU 344. The circuitry shown in FIGS. 3A and 3B can be of generally conventional design and operation. Those skilled in the art will be familiar with numerous techniques for transmitting data using a differential pair of signal paths, and any such techniques can be used in connection with headband identification as described herein.

While FIGS. 3A and 3B show a unidirectional signaling path, it should be understood that bidirectional communication between ear cups 202*a*, 202*b* can be supported. For instance, each of ear cups 202*a* can include both a USB transmit switch and a USB receive switch (and associated circuitry), each coupled to a pair of data contacts, and headband 204 can include two pairs of data lines, one for each direction. In embodiments shown herein, the headband ID circuit is coupled to the data lines connecting the USB transmit switch of the primary ear cup to the USB receive switch of the secondary ear cup (such lines can be said to carry or transmit data from the primary ear cup to the secondary ear cup). Those skilled in the art will appreciate that a headband ID circuit can instead be connected to data lines connecting a USB transmit switch of the secondary ear cup to a USB receive switch of the primary ear cup, and either ear cup can be used to receive headband identifying data from a headband ID circuit. In some embodiments, a headband ID circuit can be connected to the data lines in both directions, and both ear cups can receive headband identifying data. Thus, while the present disclosure may describe particular components or operations as being implemented in a primary (or secondary) ear cup, those skilled in the art will appreciate that any ear cup can be configured to receive headband identification information in the manner described herein, regardless of any other features or capabilities the ear cup may include.

Figure 4:
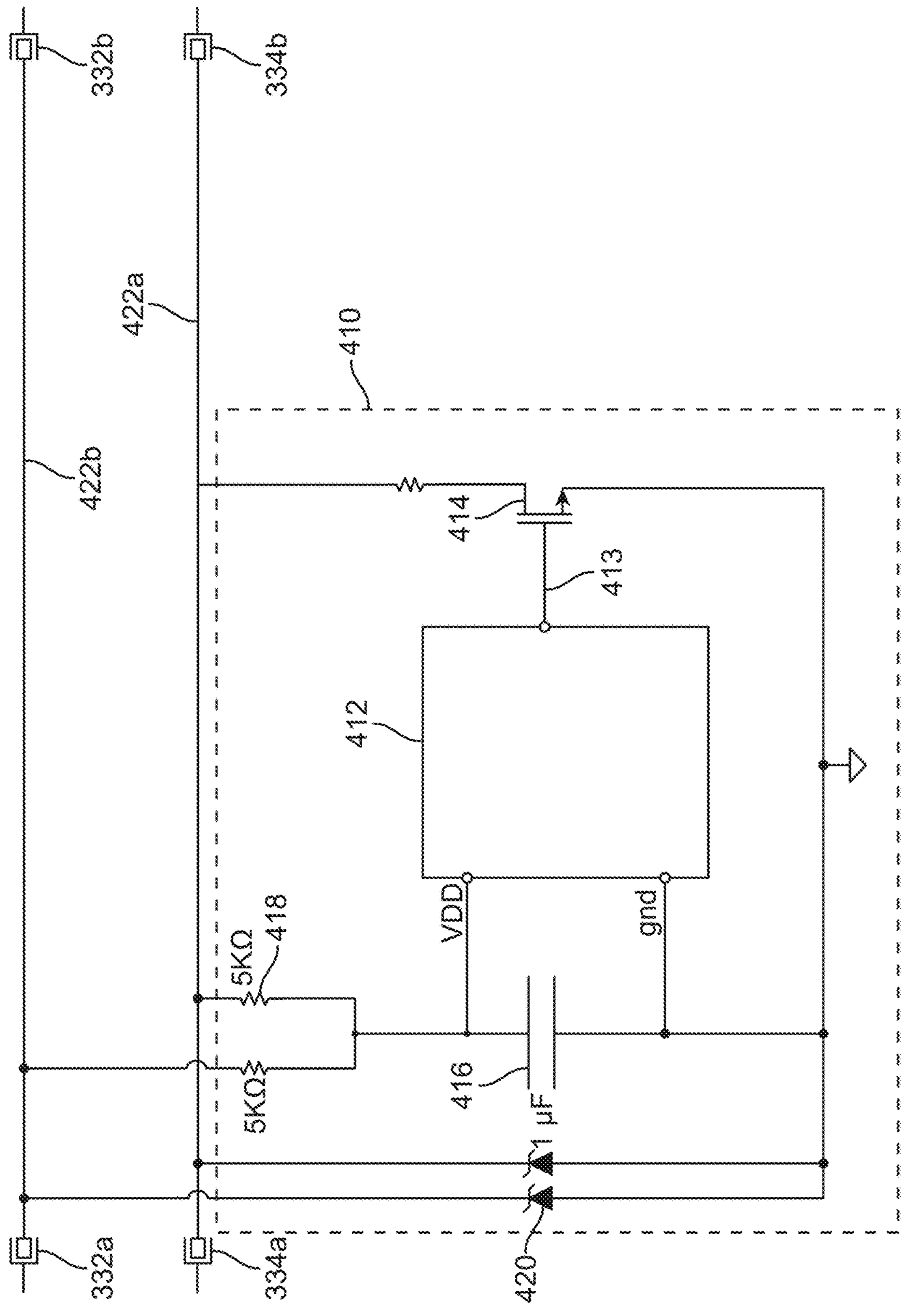
FIG. 4 shows a simplified schematic diagram of a headband ID circuit according to some embodiments.

As described above, the ear cups can rely on differential voltage across a pair of data lines to communicate data. A "pulse" can be any event that results in a voltage difference across the pair of data lines that is detectable by the receiving ear cup. Examples of headband ID circuits that can generate pulses on a pair of data lines will now be described. FIG. 4 shows a simplified schematic diagram of a headband ID circuit 410 coupled to a differential pair of data lines 422*a*, 422*b* according to some embodiments. Headband ID circuit 410 can be an implementation of HBID circuit 210 of FIG. 2. Data lines 422*a*, 422*b* can be coupled between data contacts 334*a*, 332*a* in primary ear cup 202*a* and data contacts 334*b*, 332*b* in secondary ear cup 202*b*. For instance, data lines 422*a*, 422*b* can be a subset (or all) of data lines 224 running the length of headband 204 and coupled to connectors 206 as shown in FIG. 2.

Headband ID circuit 410 includes an ASIC 412. ASIC 412 can include, e.g., an oscillator that oscillates at a frequency in the kilohertz or megahertz range (e.g., –2 MHz). The oscillator can be coupled to digital logic internal to ASIC 412 that can generate a pulsed output on output path 413. For example, ASIC 412 can be programmed to generate a specific (invariant) number N of pulses, where N is the predetermined identification parameter value for a particular type of headband. In some embodiments, ASIC 412 can also include timer logic that imposes a fixed delay between when ASIC 412 is powered on and when ASIC 412 begins generating pulses on output path 413. Output path 413 provides a voltage at a base terminal of a transistor 414 that has a collector terminal coupled to one of data lines 422 and emitter terminal coupled to ground. In some embodiments, transistor 414 can be an NPN-type bipolar junction transistor, which has reduced sensitivity to electrostatic discharge events as compared to a MOSFET; however, other types of transistors (including, e.g., NMOS or other MOSFETs) can be substituted. ASIC 412 can draw operating power (VDD) from a capacitor 416 that is coupled to data lines 422*a*, 422*b* via resistors 418. Diodes 420 can provide transient voltage suppression.

In operation, when both ends of data lines 422*a*, 422*b* become connected to ear cups, primary ear cup 202*a* (or whichever ear cup uses data lines 422*a*, 422*b* for transmitting data) can drive both of data lines 422*a*, 422*b* to a high-Z state, and capacitor 416 can begin to charge. Once capacitor 416 has charged to a sufficient level, ASIC 412 can enter an active state and starts the timer logic. The timer logic can impose a fixed delay (e.g., 16 ms), after which ASIC 412 begins generating pulses on output path 413. These pulses create transient voltage reductions on data line 422*a* (but not on data line 422*b*) due to the operation of transistor 414. This creates a differential pulsed signal that can be sensed by secondary ear cup 202*b* (or whichever ear cup uses data lines 422*a*, 422*b* for receiving data), which can detect and count the pulses, thereby determining the identification parameter.

Figure 5:
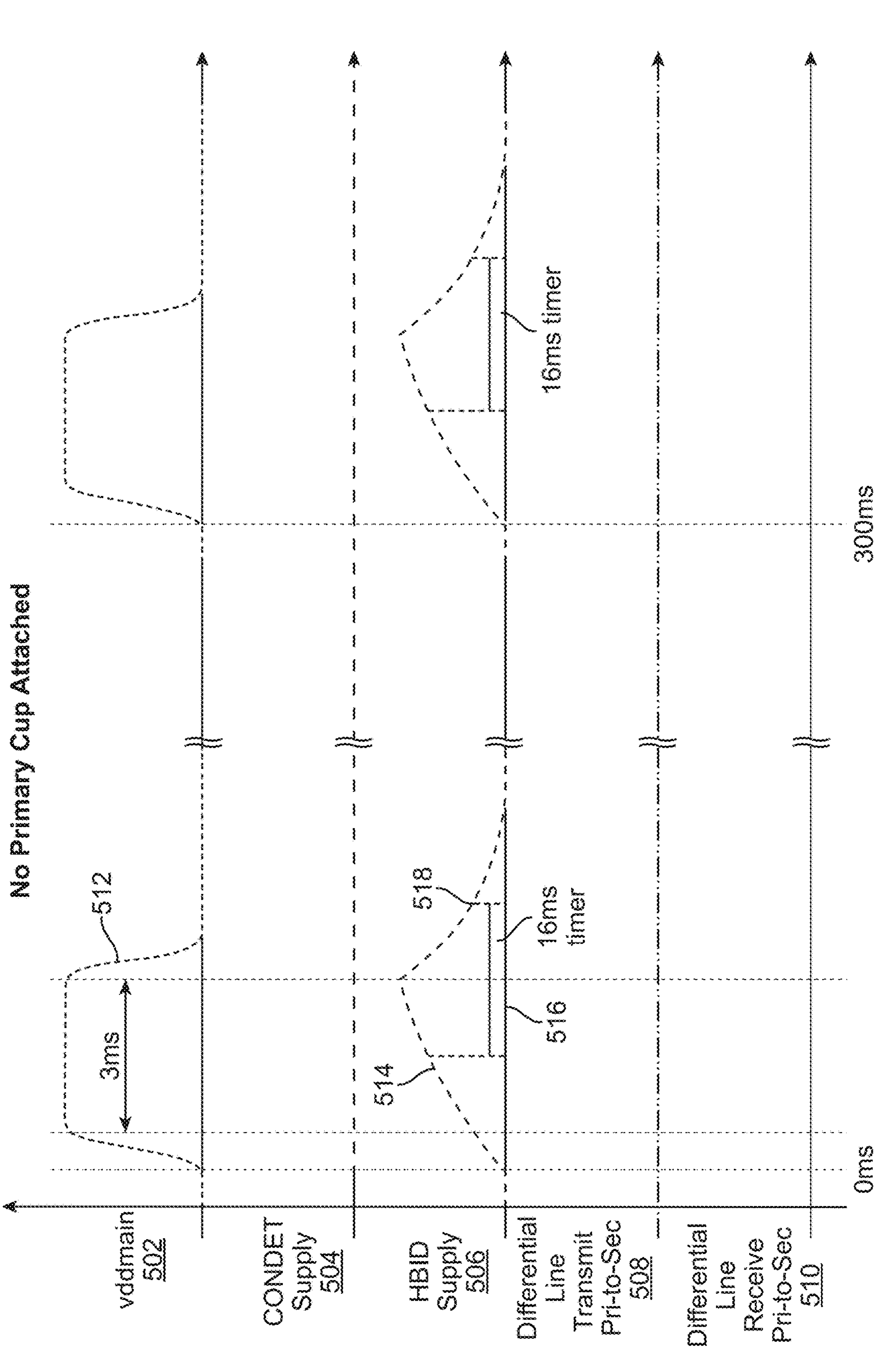
FIGS. 5 and 6 are timing diagrams showing the state of various signals in an ear cup according to some embodiments.
Figure 6:
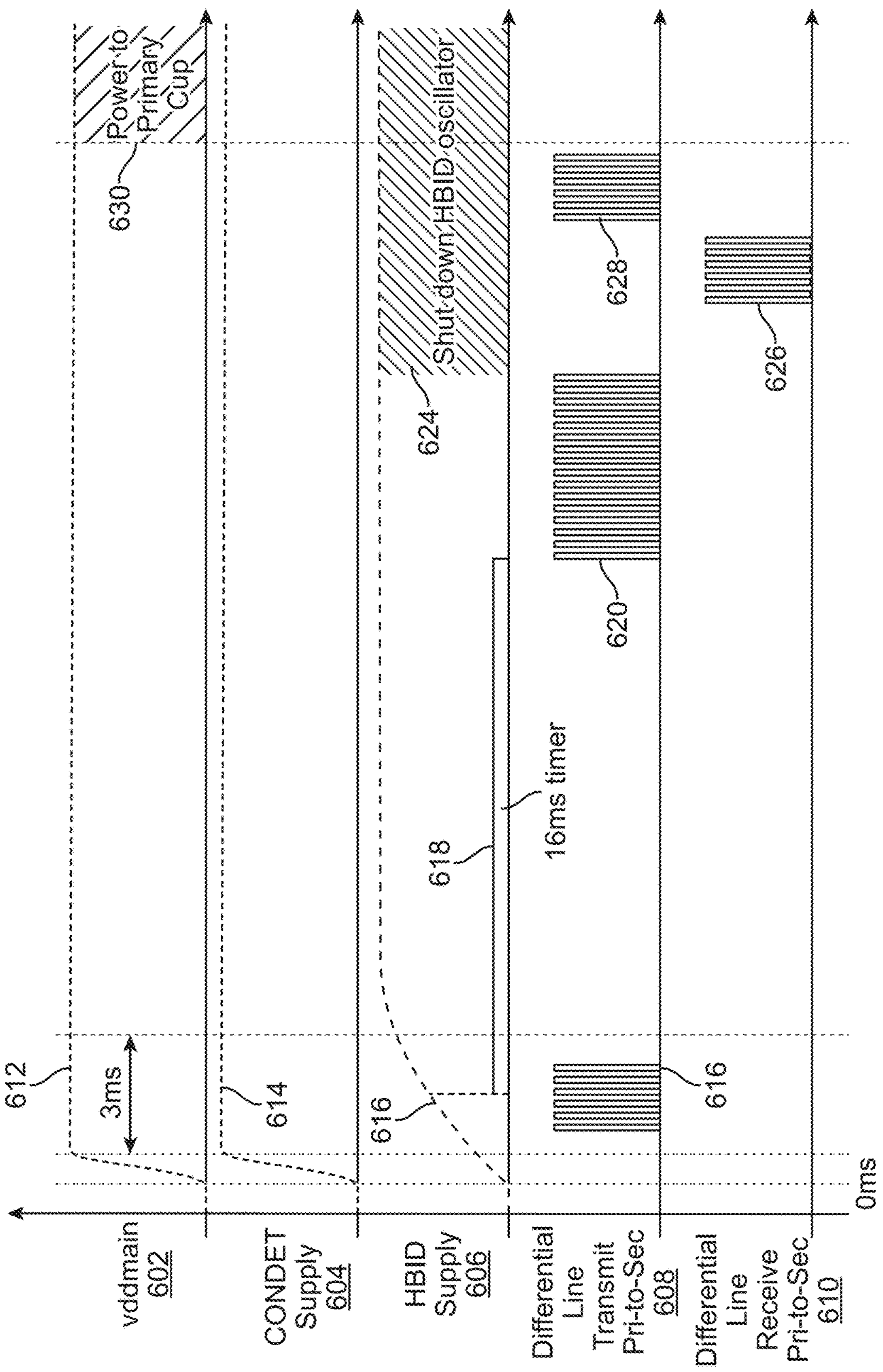

Operation of HBID circuit 410 is further illustrated in FIGS. 5 and 6, which are timing diagrams showing the state of various signals according to some embodiments. For purposes of description, it is assumed that HBID circuit 410 couples to the data lines that transmit data from primary ear cup 202*a* to secondary ear cup 202*b*. FIG. 5 shows the behavior of a secondary ear cup (e.g., secondary ear cup 202*b* of FIG. 2) when no primary cup is attached. Plot 502 represents an internal voltage ("vddmain") that secondary ear cup 202*b* can generate. Plot 504 represents a connection detect ("CONDET") supply voltage that secondary ear cup 202*b* can receive from primary ear cup 202*a*. HBID supply plot 506 represents a voltage input to ASIC 412 of HBID circuit 410, e.g., from capacitor 416). Plot 508 represents signals received by secondary ear cup 202*b* via data lines 422*a*, 422*b*, and plot 510 represents signals transmitted by secondary ear cup 202*b* to primary ear cup 202*a*.

As shown in plot 502, secondary ear cup 202*b* can periodically generate a vddmain pulse 512 having a fixed "default" duration (3 ms in this example). If there is no response from a primary ear cup (which, as described below, would appear in CONDET supply plot 504 and received data plot 508) within the default duration, secondary ear cup 202*b* can stop generating vddmain, thereby conserving power. HBID supply plot 506 shows the voltage input to ASIC 412 of headband ID circuit 410. The HBID supply voltage can rise to the point 514 where ASIC 412 becomes active and starts its timer (as indicated at 516) preparatory to generating pulses, but once vddmain drops to zero the HBID supply voltage decreases again, reaching a power-off threshold 518 before the timer expires. Consequently, as shown in plot 508, no headband ID pulses are generated on the transmit line from the (absent) primary ear cup to the secondary ear cup. In some embodiments, secondary ear cup 202*b* can actively drain capacitor 416 of headband ID circuit 410 after vddmain drops to zero, which can prevent pulses from being generated and can also reset ASIC 412. As shown in FIG. 5, as long as no primary ear cup is attached, secondary ear cup 202*b* can periodically generate vddmain pulses, e.g., a 3 ms pulse can be generated every 300 ms.

FIG. 6 shows a corresponding timing diagram to FIG. 5, for a case where primary ear cup 202*a* becomes attached (via headband 204). As shown in plot 602, secondary ear cup 202*b* can generate a voltage (vddmain) pulse 612 and receive a response within the default duration of the pulse (3 ms in this example). As shown in plot 604, the response can include, e.g., a connection-detect ("CONDET") supply signal being received at 614. The CONDET supply signal can include, e.g., power received on a power path connecting primary ear cup 202*a* to secondary ear cup 202*b*. In addition, as shown in plot 608, primary ear cup 202*a* can transmit a series of pulses 616 indicating connection detected. After transmitting CONDET pulses 616, primary ear cup 202*a* can drive its data transmit lines to high-impedance in preparation for headband ID. These events can occur within the default duration (e.g., 3 ms) of the initial vddmain pulse, and in response secondary ear cup 202*b* maintains the voltage level vddmain after 3 ms, as shown in plot 602.

As in the case of FIG. 5, vddmain pulse 612 results in the HBID supply voltage input to ASIC 412 of headband ID circuit 410 beginning to rise, as shown in plot 606, and voltage can rise to the point 616 where ASIC 412 becomes active and starts its timer (as indicated at 618). In this case, because vddmain does not cut off, the voltage input (plot 606) remains high, and the timer logic in ASIC 412 can count its full duration (16 ms in this example). When the timer elapses, ASIC 412 can generate headband identification pulses 620 on the primary-to-secondary data lines, as shown in plot 608. Headband identification pulses 620 can be received and decoded by secondary ear cup 202*b*. Once the headband identification pulses have stopped, headband ID circuit 410 can transition ASIC 412 into a low-power state, which can include e.g., turning off the oscillator as shown at 624, and secondary ear cup 202*b* can transmit CONDET pulses 626 to primary ear cup 202*a*, as shown in plot 610. After receiving the CONDET pulses from secondary ear cup 202*b*, primary ear cup 202*a* can send CONDET confirmation pulses 628 to secondary ear cup 202*b*, as shown in plot 608. In some embodiments, the exchange of CONDET pulses 626, 628 signals that the connection has been established, and primary ear cup 202*a* and secondary ear cup 202*b* can enter normal operating mode (as indicated at 630) and begin using the data lines to communicate data, including audio to be played.

In some embodiments, the initialization events shown in FIG. 6 can occur over a short period of time, so that the user experiences little or no perceptible delay between powering up the headphone system and the system being ready to use (at 630). Accordingly, the duration of the period during which headband ID pulses 620 are generated can be kept within a maximum limit consistent with an overall upper limit on the initialization time. For example, the duration of generating headband ID pulses 620 can be kept to 100 ms or less. (This duration parameter, in combination with the oscillator frequency of ASIC 412, can set an upper limit on the number of pulses that can be included in headband ID pulses 620).

Figure 7:
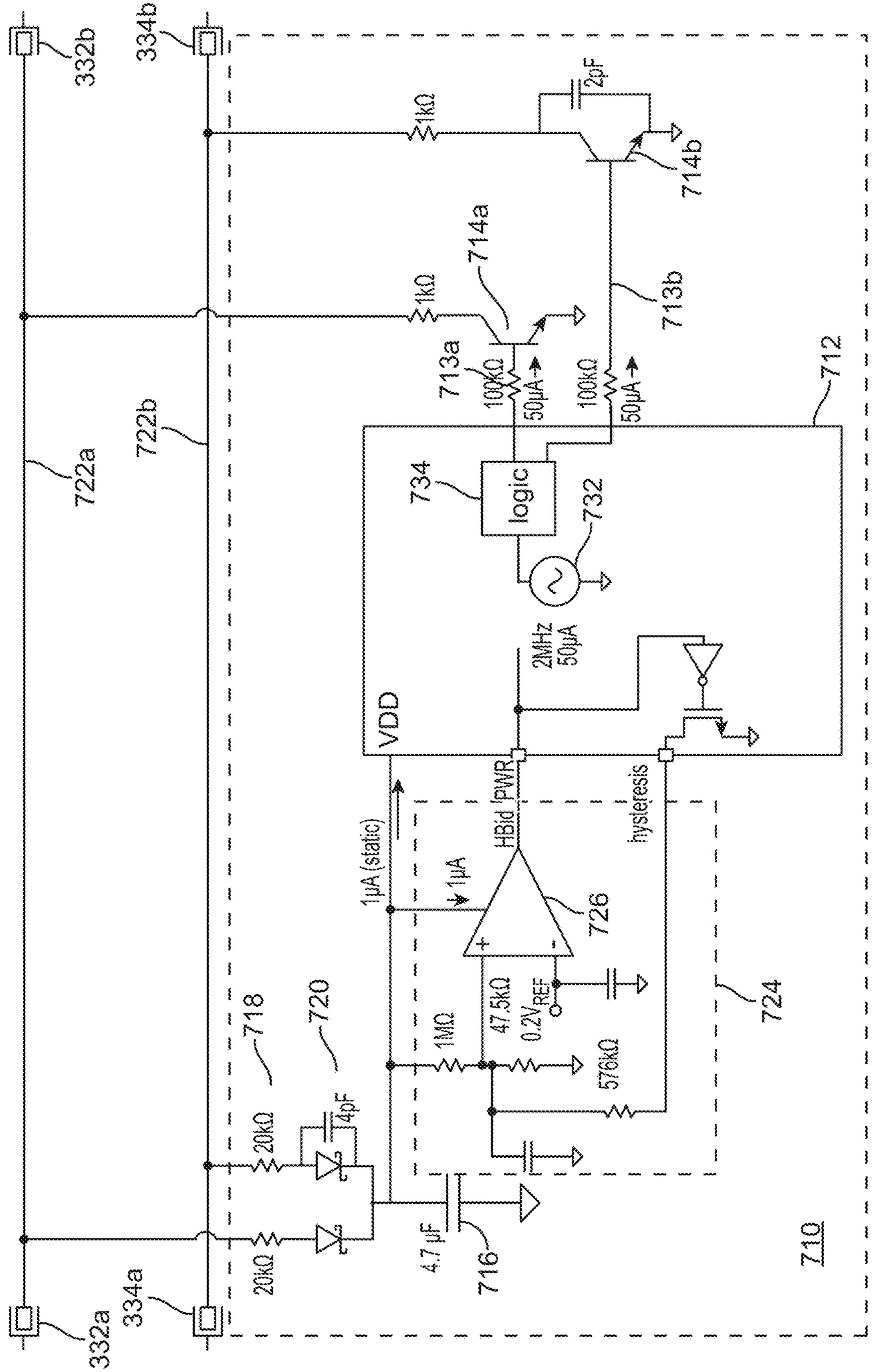
FIG. 7 shows a simplified schematic diagram of another headband ID circuit according to some embodiments.

Headband ID circuit 410 provides a low-complexity (and low-circuit-area) implementation of headband identification. Other implementations are also possible. By way of example, FIG. 7 shows a simplified schematic diagram of another headband ID circuit 710 coupled to a differential pair of data lines 722*a*, 722*b* according to some embodiments. Headband ID circuit 710 generates differential pulses on both of data lines 722*a*, 722*b*. Like headband ID circuit 410, headband ID circuit 710 can be an implementation of HBID circuit 210 of FIG. 2. Data lines 722*a*, 722*b* can be coupled between data contacts 332*a*, 334*a* in primary ear cup 202*a* and data contacts 332*b* and 334*b* in secondary ear cup 202*b*. For instance, data lines 722*a*, 722*b* can be a subset (or all of) data lines 224 running the length of headband 204 and coupled to connectors 206 as shown in FIG. 2.

Headband ID circuit 710 includes ASIC 712. ASIC 712 can include, e.g., an oscillator 732 that oscillates at a frequency in the kilohertz or megahertz range (e.g., –2 MHz). Oscillator 732 can be coupled to digital logic 734 that can generate output pulses on output paths 713*a*, 713*b*. For example, digital logic 734 can be programmed to generate a specific (invariant, or fixed) number N of pulses, where N is the predetermined identification parameter value for a particular type of headband. In some embodiments, ASIC 712 can also include timer logic that imposes a fixed delay between when ASIC 712 is powered on and when ASIC 712 begins generating pulses on output paths 713*a*, 713*b*.

Output path 713*a* provides a voltage at a base terminal of a transistor 714*a* that has a collector terminal coupled to data line 722*a* and emitter terminal coupled to ground. Similarly, output path 713*b* provides a voltage at a base terminal of a transistor 714*b* that has a collector terminal coupled to data line 722*b* and emitter terminal coupled to ground. In some embodiments, transistors 714*a*, 714*b* can be NPN-type bipolar junction transistors, which have reduced sensitivity to electrostatic discharge events as compared to a MOSFET; however, other types of transistors (including, e.g., NMOS or other MOSFETs) can be substituted.

ASIC 712 can draw operating power (VDD) from a capacitor 716 that is coupled to data lines 722*a*, 722*b* via resistors 718 and Schottky diodes 720, which can help to prevent capacitor 716 from back-powering data lines 722*a*, 722*b* during normal operation (e.g., after headband identification is completed). A monitoring circuit 724 can be provided to control when ASIC 712 begins to generate time-varying outputs. For example, a comparator 726 can monitor the DC voltage on its input lines. DC voltage can increase as capacitor 716 charges. When the DC voltage reaches a threshold, controller 726 can trigger ASIC 712 to begin generating pulses. In some embodiments, ASIC 712 can trigger hysteresis in monitoring circuit 724 so that ASIC 712 can be turned off when DC voltage decreases again.

In operation, when both ends of data lines 722*a*, 722*b* become connected to ear cups, primary ear cup 202*a* can drive data lines 722*a*, 722*b* to a high-Z state, and capacitor 716 can begin to charge. Once capacitor 716 has charged to a sufficient level, monitoring circuit 724 can trigger ASIC 712 to begin generating pulses on output paths 713*a*, 713*b*. (If desired, a timer can impose a delay, similarly to ASIC 412 described above.) Corresponding pulses are created on data lines 722*a*, 722*b*. This creates a differential pulsed signal that can be sensed by secondary ear cup 202*b*, which can detect and count the pulses, thereby determining the identification parameter. Operation can be similar or identical to operations and timing described above with reference to FIGS. 5 and 6.

Figure 8:
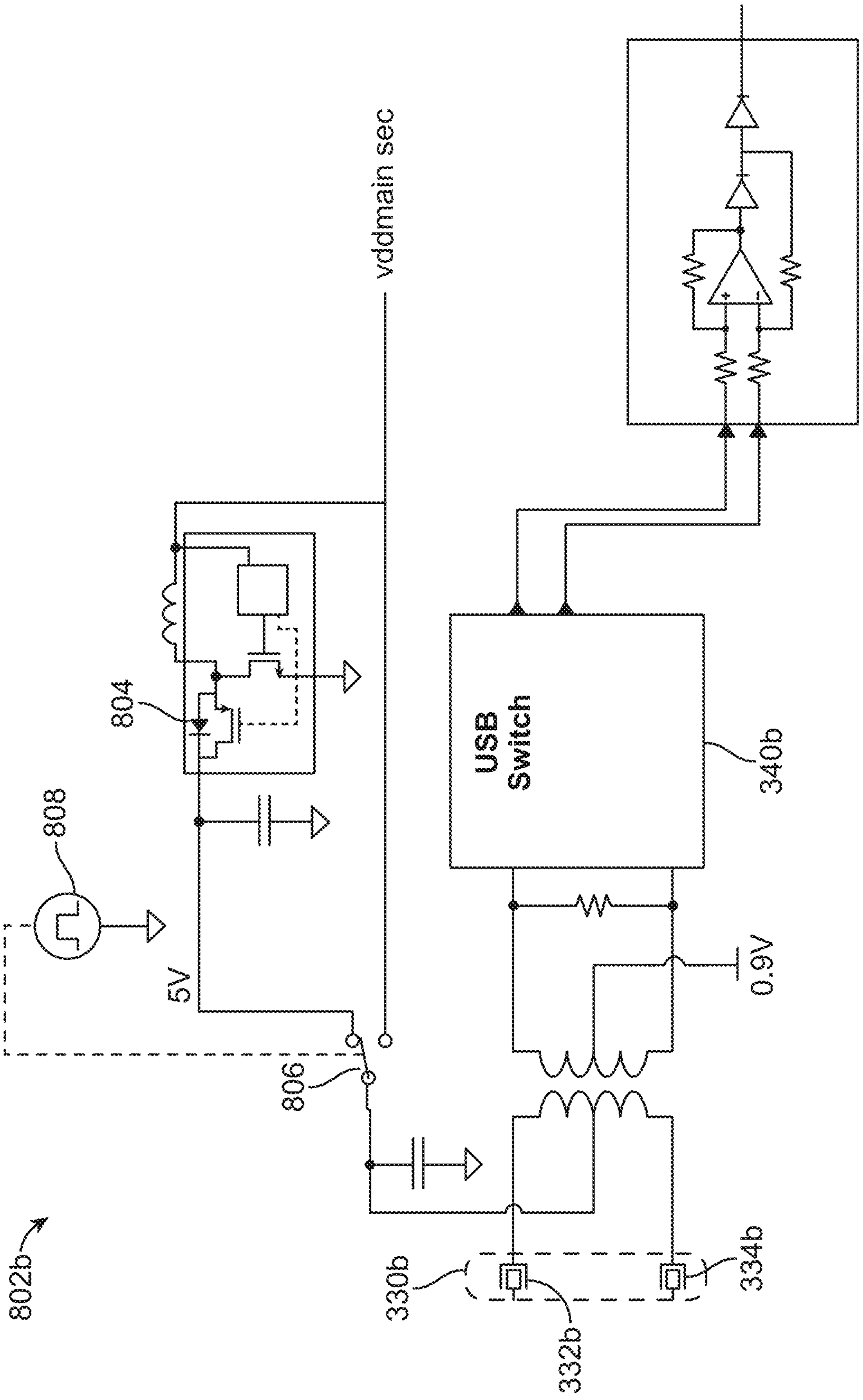
FIG. 8 shows a simplified schematic diagram of a circuit for an ear cup according to some embodiments.

In some embodiments, HBID circuit 712 can rely on a voltage boost provided by the secondary ear cup. FIG. 8 shows a simplified schematic diagram of circuitry in a secondary ear cup 802*b* according to some embodiments. Secondary ear cup 802*b* can be similar to secondary ear cup 202*b* described above, with the same USB receiver circuitry as shown in FIG. 3, including USB receiver switch 340*b* inductively coupled to data contacts 332*b*, 334*b* in connector 330*b*. In this embodiment, secondary ear cup 802*b* also includes a voltage boost circuit 804, which can drive a higher than normal voltage on the data lines. Voltage boost circuit 804 can be switched on during headband identification and off thereafter using a switch 806 controlled by a timing signal 808. Timing signal 808 can be generated at a fixed time after detecting the presence of a primary ear cup coupled to data contacts 332*b*, 334*b*.

It will be appreciated that the headband ID circuits described herein are illustrative and that variations and modifications are possible. Any circuit components and associated values (e.g., resistances, capacitances, timing, etc.) identified in the drawings can be modified or different components can be substituted. In the examples shown, transistors are used to implement switches to create transient voltage drops on one or more data lines; other types of electronic switches can be substituted. Further, while the ASICs in the examples above generate pulses on the data line(s) that can be counted using circuitry in one of the ear cups, an ASIC can be configured to support a different encoding scheme, including encoding schemes that incorporate timing elements (e.g., time between pulses and/or duration of pulses) in addition to or instead of counting pulses. A variety of circuits can be used to communicate a stored or encoded headband-identification parameter value to an ear cup, provided that these circuits do not interfere with data communication between the ear cups after the headband-identification parameter value has been communicated. In some embodiments, such as the examples described herein, the headband ID circuit can be configured to enter and remain in a low-power state after sending the identification data.

Figure 9A:
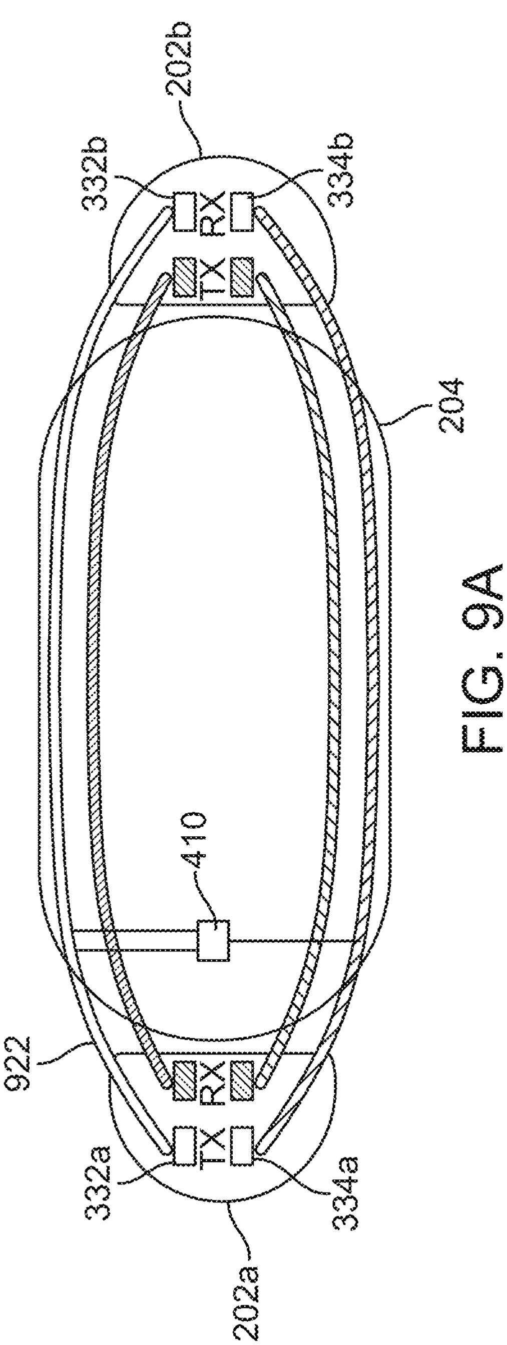
FIGS. 9A and 9B illustrate reversibility of a headband according to some embodiments
Figure 9B:
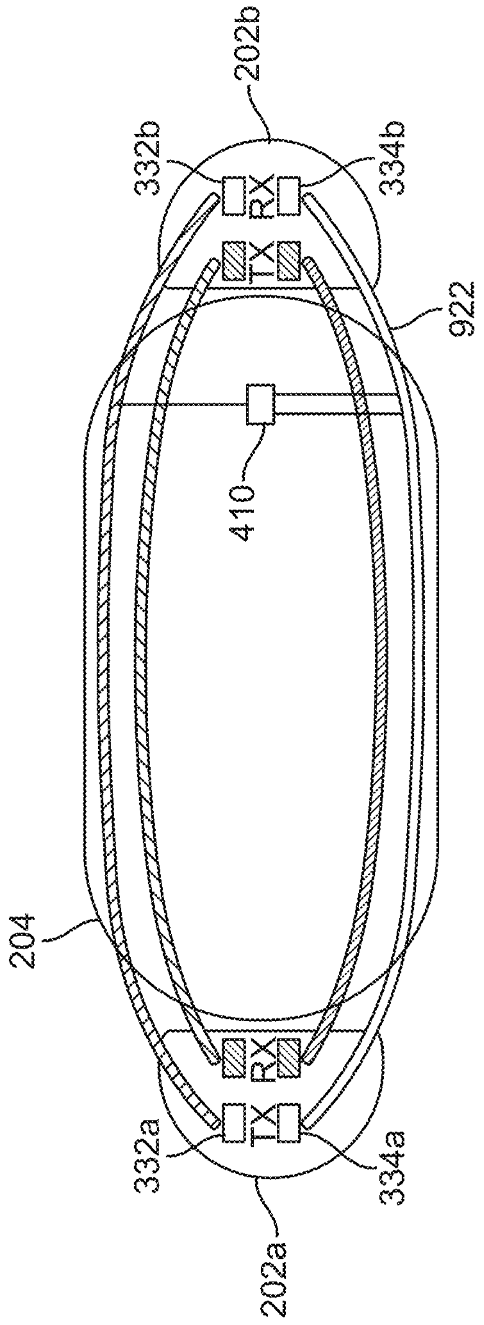

As noted above, the connectors 206 at the two ends of headband 204 (or connector assemblies 106 at the two ends of headband 104) can be identically constructed, so that either end of headband 204 can be connected to either ear cup 202*a*, 202*b*. FIGS. 9A and 9B illustrate reversibility of headband 204 according to some embodiments. FIG. 9A shows headband 204 in a first orientation, with headband ID circuit 410 (of FIG. 4) coupled to pull down on data line 922, which in this orientation connects transmit contact 332*a* in primary ear cup 202*a* to receive contact 332*b* in secondary ear cup 202*b*. FIG. 9B shows headband 204 in a second orientation reversed from the orientation of FIG. 9A. Headband ID circuit 210 is coupled to pull down on the same data line 922, which in this orientation connects transmit contact 334*a* in primary ear cup 202*a* to receive contact 334*b* in secondary ear cup 202*b*. In these two orientations, headband ID circuit 210 pulls down on opposite-polarity data lines (D+ in one case, D− in the other), but in either case, a voltage differential is created that can be detected by the receiver in secondary ear cup 202*b*. It should be understood that reversibility of a headband is not required. For instance, a headband can have disparate connectors at each end, and primary and secondary ear cups can have corresponding connectors such that one end of a headband is only connectable to a primary ear cup while the other end is only connectable to a secondary ear cup.

In some embodiments, a headband ID circuit such as HBID circuit 410 of FIG. 4 or HBID circuit 710 of FIG. 7 can be designed to occupy a small area so that it does not require a significant increase in size of the headband. For example, a headband ID circuit can be integrated into connector assembly 106 of FIG. 1.

Figure 10A:
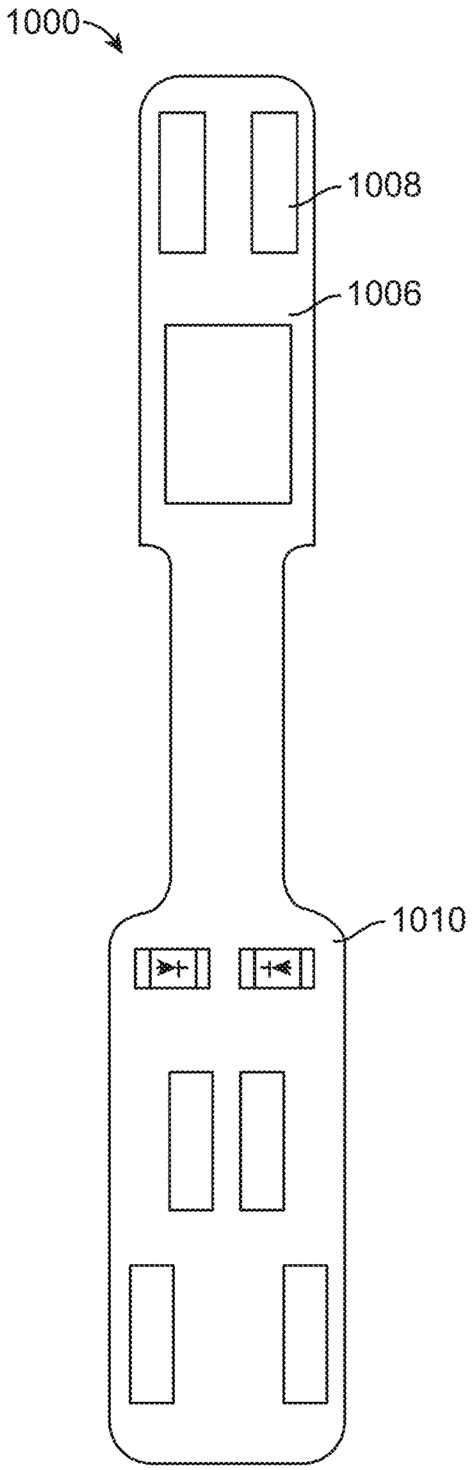
FIGS. 10A and 10B show bottom and top views of a printed circuit board that incorporates a headband ID circuit according to some embodiments.
Figure 10B:
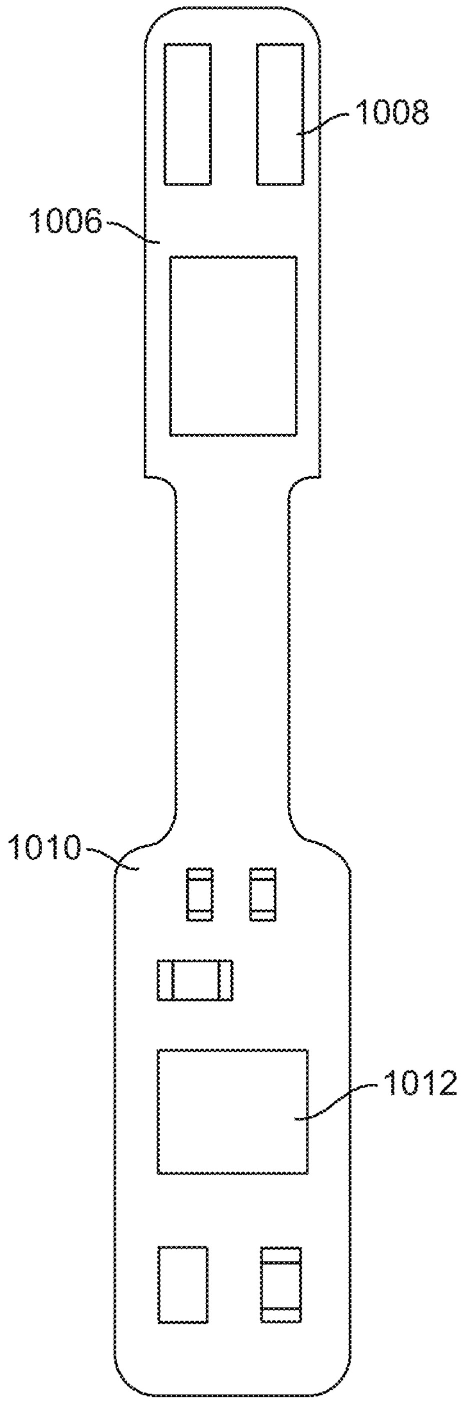

FIGS. 10A and 10B show bottom and top views of a printed circuit board (PCB) 1000 that incorporates a headband ID circuit according to some embodiments. PCB 1000 includes a tongue section 1006 and a tail section 1010. Tongue section 1006 can include contact pads 1008, which can be connected to external contacts 108 shown in FIG. 1. Tail section 1010 can include other circuitry, such as ASIC 1012 (which can be, e.g., ASIC 412 or ASIC 712 described above) and supporting circuit components (capacitors, resistors, diodes, transistors, etc.) for a headband ID circuit (e.g., any of the examples described above). The particular layout of tail section 1010 can be modified as desired. In some embodiments, an elongated and narrow profile can allow connector assembly 106 to be similarly elongated and narrow, which may be desirable for the esthetics and/or comfort of a headband.

Figure 11A:
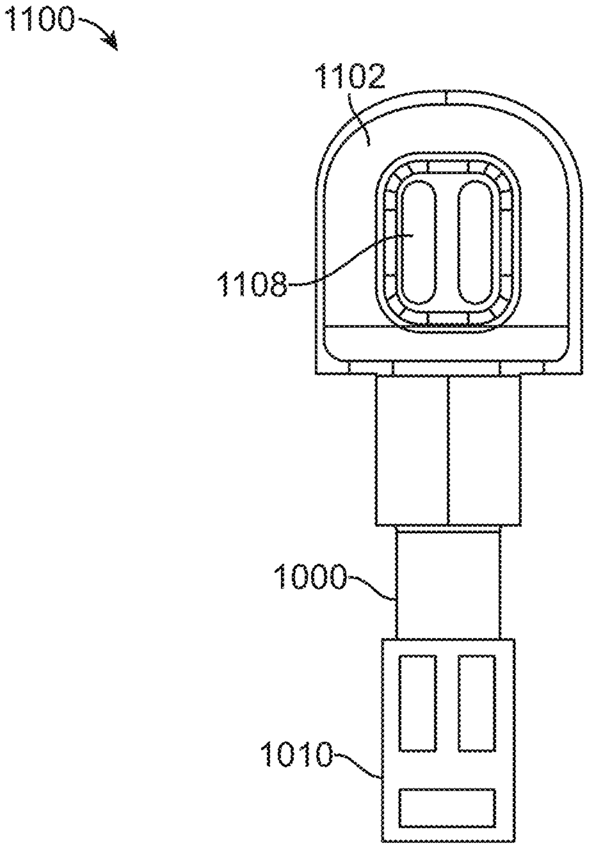
FIGS. 11A and 11B show an assembled view and an exploded view of a connector assembly according to some embodiments.
Figure 11B:
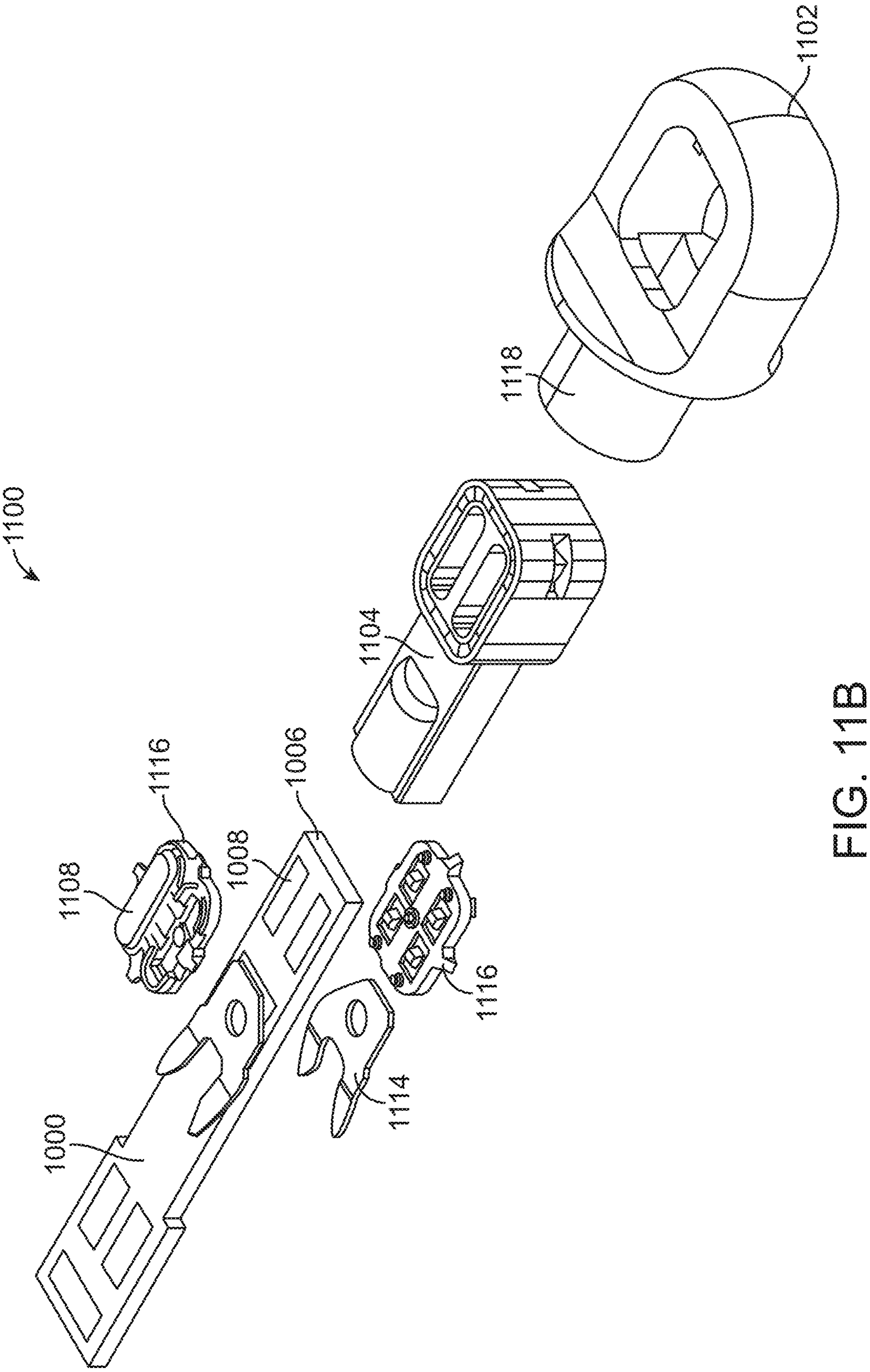

FIGS. 11A and 11B show a connector assembly 1100 according to some embodiments, with FIG. 11A showing an assembled view and FIG. 11B showing an exploded view. Connector assembly 1100 can be an implementation of connector assembly 106 of FIG. 1 and can incorporate PCB 1000 of FIGS. 10A and 10B. Connector assembly 1100 can include an end cap 1102 having openings therein exposing contacts 1108, which can be electrically coupled via an insert-molded assembly 1116 to contact pads 1008 on PCB 1000. Overmold 1104 and ground spring 1114 can secure PCB 1000 in place with tongue section 1006 inside end cap 1102 such that contacts 1108 are exposed. A ground ring 1118 can be provided around end cap 1102.

PCB 1000 and connector assembly 1100 are illustrative, and variations and modification are possible. A particular size of a connector assembly or arrangement of components and contacts is not required.

Using circuits and techniques of the kind described above, a parameter value representing headband-identification information can be communicated from a headband ID circuit in a headband to an ear cup connected to the headband. The communication can occur automatically when the headband becomes attached to the ear cups. For example, as described above, secondary ear cup 202*b* can receive the identification pulse sequence and deliver a corresponding signal to MCU 344. In some embodiments, MCU 344 (shown in FIG. 3B) can be configured (e.g., programmed) to recognize the identification pulse sequence. For instance, in the example of FIGS. 5 and 6, MCU 344 can recognize the identification pulse sequence based on timing relative to other events in an initialization sequence. MCU 344 can also be configured to decode the pulse sequence (e.g., by counting pulses) to extract (or read) the identification parameter value. In some embodiments, an ear cup can use the identification parameter value locally, e.g., within MCU 344. In some embodiments, the ear cup that receives the identification parameter value can communicate the identification parameter value to the other ear cup using the appropriate data path. Additionally or instead, an ear cup can communicate the identification parameter value to a host device with which the headphone system is communicably coupled.

An ear cup or host device that reads or receives a headband identification parameter value can use the parameter value in a variety of applications. For example, a host device can have a graphical user interface that renders an image of a connected headphone system, e.g., when reporting status of a headphone system or when assisting a user in identifying a headphone system to connect. In some embodiments, the host device can use the headband identification parameter value to modify the rendered image. For instance, if the parameter value maps to a headband color, the headband color can be modified according to the parameter value. Other aspects of appearance of a headband (e.g., width of the headband, presence/absence or type of padding) can also be modified to the extent that the identification parameter value can be mapped to various aspects of appearance. In some embodiments, the host device (or an ear cup) can use the headband identification parameter value to adjust an acoustic setting. For example, different types of headbands can exert different clamping forces on the ear cups, and the clamping force may alter the acoustic response profile of the ear cups. Accordingly, if the identification parameter value is mapped to an amount of clamping force or to a particular effect on acoustic response, the host device (or an ear cup) can modify an audio signal to compensate for the effect. In some embodiments, the ear cup (or a host device) can use the identification parameter value to adjust an on-head detection system. For example, some ear cups can include optical (e.g., infrared) sensor systems to determine when the ear cup has been positioned proximate to a user's ear. The behavior of the optical sensor system can depend on the toe-in angle of the ear cup, which can be different for different headband types. Accordingly, in some embodiments, the ear cup can adjust an angle of an optical sensor to compensate for differences in toe-in angle between headband types. In some embodiments, different headband types can have different effects on battery life. For instance, battery life can be affected by the length or construction of the power and data lines in the headband. Accordingly, in some embodiments, an ear cup or host device can use the headband identification parameter value to refine an estimate of remaining battery life. In some embodiments, some headband types may include active circuitry implementing "advanced" features (e.g., microphones to sample the acoustic environment or other sensors that can be used to monitor the environment or the user), and the headband identification parameter can indicate which (if any) advanced features are implemented. Accordingly, in some embodiments, an ear cup or host device can modify its behavior based on the availability or unavailability of various advanced features. A headband identification parameter as described herein can be used for any combination of any of these and/or other purposes.

While the invention has been described with respect to specific embodiments, one skilled in the art will recognize that numerous modifications are possible. For example, although the description makes reference to headbands that are designed to fit over the top of the user's head, other types of headbands exist, such as headbands that wrap around the back of the head or the like. Headband identification can be used with any type of headband.

The amount, content, and format of identification data or identification information can be varied as desired. The number of distinct identification parameter values can be defined based on the number of headband types to be distinguished. In some embodiments, up to 32 or up to 256 distinct parameter values can be supported; the particular upper limit is a matter of design choice and can be in the thousands or hundreds of thousands. Where headband types are distinguishable based on multiple attributes, lookup tables or the like can be used to map an arbitrary numerical parameter value to a particular combination of attributes.

As described above, identification data can be used to modify device behavior, including the production of sound by the ear cups, user interface features, and so on. Other behavior modifications and/or user-supportive operations can be implemented based on the identification data.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable storage media encoded with the program code may be packaged with a compatible electronic device. Additionally or instead, the program code may be provided separately from electronic devices (e.g., via Internet download or as a separately packaged computer-readable storage medium).

In some embodiments, the identification data can uniquely identify a particular cushioning member that belongs to a particular user; where this is the case, the identification data might be regarded as personally identifiable information. It is well understood that the use of personally identifiable information should follow privacy policies and practices that are generally recognized as meeting or exceeding industry or governmental requirements for maintaining the privacy of users. In particular, personally identifiable information should be managed and handled so as to minimize risks of unintentional or unauthorized access or use, and the nature of authorized use should be clearly indicated to users. For instance, in some embodiments, identification data for a cushion or tip need not be provided to any entity other than the earpiece or (optionally) a user-owned host device with which the earpiece interoperates. Users may be informed of and prompted to opt in to any sharing of data that may occur.

Thus, although the invention has been described with respect to specific embodiments, it will be appreciated that the invention is intended to cover all modifications and equivalents within the scope of the following claims.

What is claimed is:

1. An electronic device comprising:

a first connector assembly disposed at a first end location;

a second connector assembly disposed at a second end location;

a set of data lines connected between the first connector assembly and the second connector assembly, the set of data lines including a first data line; and an identification circuit coupled to the first data line and configured to generate an identification pulse pattern on the first data line.

2. The electronic device of claim 1 wherein the identification circuit is disposed on a printed circuit board in the first connector assembly.

3. The electronic device of claim 1 wherein the identification pulse pattern includes a predetermined number of pulses that the identification circuit is configured to generate.

4. The electronic device of claim 1 wherein the identification circuit includes:

a switch coupled between the first data line and ground; and control logic configured to toggle the switch between an open state and a closed state, thereby generating a predetermined number of pulses on the first data line.

5. The electronic device of claim 4 wherein the switch comprises a transistor and the control logic is coupled to a gate terminal of the transistor.

6. The electronic device of claim 4 wherein the identification circuit further comprises a capacitor coupled to the first data line and configured to provide operating power to the control logic.

7. The electronic device of claim 1 wherein the set of data lines further includes a second data line and wherein the identification circuit is further coupled to the second data line and further configured to generate the identification pulse pattern by generating voltage differences between the first data line and the second data line.

8. The electronic device of claim 1 wherein the identification circuit is configured to generate the identification pulse pattern in response to a first external device becoming connected to the first connector assembly and a second external device becoming connected to the second connector assembly.

9. A first electronic device comprising:

a connector configured to detachably attach to a connector assembly of a second electronic device, the connector including a data contact configured to couple to a data line of the second electronic device;

a receiver circuit coupled to the connector and configured to receive an identification pulse pattern via the data contact, the identification pulse pattern including a number of pulses, wherein the number of pulses is at least two; and a controller coupled to the receiver circuit and configured to determine an identification parameter value for the second electronic device based at least in part on the number of pulses in the identification pulse pattern.

10. The first electronic device of claim 9 further comprising:

a communication interface coupled to the controller and configured to communicate with a host device, wherein the controller is further configured to send the identification parameter value to the host device via the communication interface.

11. The first electronic device of claim 10 wherein the controller is further configured to modify a behavior of the first electronic device based on the identification parameter value.

12. A system comprising:

a connecting device having:

a first connector assembly disposed at a first end location;

a second connector assembly disposed at a second end location;

a set of data lines connected between the first connector assembly and the second connector assembly, the set of data lines including a first data line; and an identification circuit coupled to the first data line and configured to generate an identification pulse pattern on the first data line;

a first end device having:

a third connector assembly configured to detachably attach to the first connector assembly of the connecting device, the third connector assembly including a data contact configured to couple to the first data line of the connecting device;

a receiver circuit coupled to the third connector assembly and configured to receive an identification pulse pattern via the data contact; and a controller coupled to the receiver circuit and configured to determine an identification parameter value for the connecting device based on the identification pulse pattern; and a second end device having a fourth connector assembly configured to detachably attach to the second connector assembly of the connecting device, the second connector assembly including a data contact configured to couple to the first data line of the connecting device.

13. The system of claim 12 wherein the identification circuit is disposed on a printed circuit board in the first connector assembly.

14. The system of claim 12 wherein the identification pulse pattern includes a predetermined number of pulses that the identification circuit is configured to generate.

15. The system of claim 12 wherein the identification circuit includes:

a switch coupled between the first data line and ground; and control logic configured to toggle the switch between an open state and a closed state, thereby generating a predetermined number of pulses on the first data line.

16. The system of claim 15 wherein the switch comprises a transistor and the control logic is coupled to a gate terminal of the transistor.

17. The system of claim 15 wherein the identification circuit further comprises a capacitor coupled to the first data line and configured to provide operating power to the control logic.

18. The system of claim 12 wherein the set of data lines further includes a second data line and wherein the identification circuit is further coupled to the second data line and further configured to generate the identification pulse pattern by generating voltage differences between the first data line and the second data line.

19. The system of claim 12 wherein the identification circuit is configured to generate the identification pulse pattern in response to the first end device becoming connected to the first connector assembly and the second end device becoming connected to the second connector assembly.

20. The system of claim 12 wherein one of the first end device or the second end device includes:

a communication interface coupled to the controller and configured to communicate with a host device, wherein the controller is further configured to send the identification parameter value to the host device via the communication interface.

* * * * *